UNITED STATES PATENT OFFICE.

GEORGE T. LEWIS, OF PHILADELPHIA, PENNSYLVANIA, AND CARL V. PETRAEUS, OF CAMDEN, NEW JERSEY, ASSIGNORS TO THE WESTERN PATENT COMPANY, OF DENVER, COLORADO.

PROCESS OF TREATING SULPHIDE ORES OF ZINC AND LEAD.

SPECIFICATION forming part of Letters Patent No. 481,499, dated August 23, 1892.

Application filed July 8, 1889. Renewed January 12, 1892. Serial No. 417,782. (No specimens.)

*To all whom it may concern:*

Be it known that we, GEORGE T. LEWIS, of the city and county of Philadelphia, State of Pennsylvania, and CARL V. PETRAEUS, of Camden, in the county of Camden and State of New Jersey, citizens of the United States, have invented a new and useful Process for Treating Sulphide Ores of Lead and Zinc With or Without Precious Metals, of which the following is a specification.

Our process consists in roasting the ore. The roasted ore is then treated in a blast-furnace, where, according to the quantity of lead in the ore, more or less lead or base bullion is smelted down, while a large portion of the zinc and lead carrying a considerable quantity of silver, if silver be in the ore, escapes as fumes. These fumes we expose to the action of the acid gases which escape from the roasting-furnace and to water by passing these fumes through one or more towers containing flint or other similar substances (we prefer coke) which are not attacked by acids, but upon which the fumes will condense, through which at the same time water is run. The fumes from the smelting-furnace may pass directly from the furnace into the bottom of of the towers, where the acid gases from the roasting-furnace also enter, and, together with these, pass up into the mass that fills the tower or towers, while a rain of water constantly passes down through the towers. In this manner we obtain a pulp-like mass in which the zinc is held in solution, while the lead is held as an insoluble compound. The zinc solution may be separated from the solid lead compound by filtration or by other means.

Instead of passing the fumes from the smelting-furnace directly to the towers, they may be condensed first in a bag condenser, then made into a pulp with water, and this pulp passed through the tower exposed to acid fumes from the roasting-furnace. The fumes when condensed in bags, after first making into a pulp with water, may be placed in chambers and the gases from the roasting-furnace passed through said chambers, or the pulp may be placed in a cylinder with agitating-arms or in an agitator and the gases from the roasting-furnace passed through said cylinder or agitator. In any case when the fumes from the smelting-furnace are exposed to the gases from the roasting-furnace the zinc is rendered soluble, the lead remaining in the form of an insoluble compound, which will contain silver carried over with the fumes from the smelting-furnace. The zinc solution is separated from the lead compound by filtration or other means and the lead smelted down. The zinc solution will sometimes contain silver in solution. To precipitate this, I prefer to let it stand in contact with a block of metallic zinc for about twenty-four hours. The clear zinc solution may be boiled down and roasted, or it may be precipitated by an alkali or an alkaline carbonate, &c., and the zinc recovered.

Having now fully described our process, what we claim, and desire to protect by Letters Patent, is—

The process of recovering lead and zinc from sulphureted lead and zinc-lead ore, which consists in roasting the ore, then smelting the roasted mass and exposing the fumes or volatile matter produced by said smelting to the action of the gases which are volatilized in the roasting of said ore, together with water, and then separating the zinc solution from the insoluble lead compound and recovering the zinc and lead, substantially as described.

In testimony of which invention we have hereunto set our hands, at Philadelphia, Pennsylvania, this 5th day of June, 1889.

GEORGE T. LEWIS.
CARL V. PETRAEUS.

Witnesses:
H. B. RIANHARD,
ABNER J. DAVIS.